United States Patent
Yang et al.

(10) Patent No.: US 7,616,194 B2
(45) Date of Patent: Nov. 10, 2009

(54) KEY LOCK MEANS AND APPLICATION METHOD OF THE SAME

(75) Inventors: Ching-Hwa Yang, Taipei Shien (TW); Chi-Tong Lai, Taoyuan (TW)

(73) Assignee: Quanta Computer Inc., Tao Yuan Shien (TW)

( * ) Notice: Subject to any disclaimer, the term of this patent is extended or adjusted under 35 U.S.C. 154(b) by 680 days.

(21) Appl. No.: 11/363,927

(22) Filed: Mar. 1, 2006

(65) Prior Publication Data

US 2007/0085839 A1    Apr. 19, 2007

(30) Foreign Application Priority Data

Oct. 14, 2005    (TW) ............... 94136021 A

(51) Int. Cl.
*G06F 3/041* (2006.01)
(52) U.S. Cl. ..................................... 345/173
(58) Field of Classification Search ................. 345/156, 345/168–178; 178/18.01–18.11
See application file for complete search history.

(56) References Cited

U.S. PATENT DOCUMENTS 6,011,544 A * 1/2000 Sato ........................... 345/168
6,177,926 B1 * 1/2001 Kunert ........................ 345/173
2003/0137497 A1 * 7/2003 Kojo et al. ................... 345/173
2005/0038982 A1 * 2/2005 Park et al. ....................... 713/1
2005/0219217 A1 * 10/2005 Longobardi et al. ......... 345/169
2006/0012577 A1 * 1/2006 Kyrola ........................ 345/173

FOREIGN PATENT DOCUMENTS

TW            467340        12/2001

\* cited by examiner

*Primary Examiner*—Amr Awad
*Assistant Examiner*—Rodney Amadiz
(74) *Attorney, Agent, or Firm*—Rabin & Berdo, P.C.

(57) ABSTRACT

A key lock means set on a tablet personal computer and application method of the same are provided, wherein the key lock means comprises a graphic input device, a typing input device, and means for signal associating. The graphic input device is used for generating and transmitting a first signal to an operating system of the tablet computer. The typing input device is used for generating and transmitting a second signal to the operating system of the tablet computer. The means for signal associating is used for monitoring and controlling the transmitting process of the first and second signals. When the first signal is detected, the means for signal associating can prevent the typing input device from transmitting the second signal into the operating system of the tablet personal computer.

2 Claims, 4 Drawing Sheets

KEY LOCK MEANS AND APPLICATION METHOD OF THE SAME

RELATED APPLICATIONS

The present application is based on, and claims priority from, Taiwan Application Serial Number 94136021, filed Oct. 14, 2005, the disclosure of which is hereby incorporated by reference herein in its entirety.

FIELD OF THE INVENTION

The present invention relates to a tablet personal computer, and particularly relates to a key lock means used for a tablet personal computer and application method of the same.

BACKGROUND OF THE INVENTION

As software has developed, manufacturers have provided tablet personal computers offering graphic input functionality. Tablet personal computers offer several advantages, such as powerful calculation ability, broad screens, and particularly intuitive graphic input devices similar to those found in personal digital assistants, all of which can improve users' operation habits, provide more convenience and make personal computers more available for various circumstances.

Generally, a tablet personal computer not only provides a typing input device but also provides a graphic input device. A typical graphic input device comprises a digitizer, such as a touch panel. A user can input signals to the operating system of the tablet personal computer by touching the digitizer via a stylus or fingers. A typical typing input device is used for inputting signals to the operating system of the tablet personal computer by pressing the built-in keys adjacent to the screen of the tablet personal computer. The built-in keys also comprise virtual buttons set on the touch panel, which can be touched to input signals into the operating system of the tablet personal computer.

FIG. 1 is a block diagram illustrating the signal inputting process of a tablet personal computer in accordance with the prior art. Typically, a graphic input device (such as a touch panel or a digitizer 101) and a typing input device (such as a button 103) of a tablet personal computer are respectively controlled by embedded controllers (EC) 105 and EC 107. When the digitizer 101 is touched by a stylus (not shown), a signal is generated and transmitted into the operating system 109 of the tablet personal computer through a RS232 serial communication interface or a USB interface, wherein the EC 105 controls the signal transmitting process. Similarly, when a button 103 is pressed, a signal is generated and transmitted to the operating system 109 of the tablet personal computer, wherein the EC 107 controls the signal transmitting process.

When a user is operating the graphic input device, the button 103 may be touched unintentionally, causing the EC 107 to transmit an undesired signal to the operating system 109 of the tablet personal computer to disrupt the operating system 109.

To resolve this problem, a manual switch is provided to control the EC 107 to ignore signals generated by the button 103 while the graphic input device is being operated.

However, the provision of the switch makes the signal graphic inputting process more complicated and inconvenient.

SUMMARY OF THE INVENTION

Therefore, it is necessary to provide a tablet personal computer a key lock means to eliminate the disruption by undesired signals due to an unintended touch of a typing input device during a graphic inputting process and to provide the user a friendlier operating instance.

One aspect of present invention is to provide a key lock means for a tablet personal computer, wherein the key lock means comprises a typing input device, a graphic input device, and means for signal associating. The graphic input device is used for conducting a graphic input process to generate and transmit a first signal to the operating system of the tablet personal computer. The typing input device is used for conducting a typing input process to generate and transmit a second signal to the operating system of the tablet personal computer. The means for signal associating is used to monitor and control the transmitting process of the first and second signals. When the first signal is detected, the means for signal associating can prevent the typing input device from transmitting the second signal into the operating system of the tablet personal computer.

Another aspect of the present invention is to provide a tablet personal computer having a key lock means to eliminate the disruption by undesired signals due to an unintended touch of a typing input device during a graphic inputting process and to create a friendlier operating instance for a user, wherein the tablet personal computer comprises a digitizer, a button, a first signal control element, a second signal control element and means for signal associating. The digitizer set on the screen of the tablet personal computer is used to generate and transmit a first signal to the operating system of the tablet personal computer. The button set on the tablet personal computer is used to generate and transmit a second signal to the operating system of the tablet personal computer. The first signal control element is used to control the transmitting process of the first signal, and the second signal control element is used to control the transmitting process of the second signal. The means for signal associating is used to monitor and control the first signal control element and the second signal control element. When the first signal is generated, the means for signal associating can prevent the second signal control element from transmitting the second signal into the operating system of the tablet personal computer.

Yet another aspect of the present invention is to provide a key lock method for preventing a tablet personal computer form receiving undesired signals due to an unintended touch of a type input device during a graphic inputting process, wherein the method comprises: providing a graphic input device, a typing input device and a means for signal associating; using the graphic input device having a digitizer to input a first signal to the operating system of the tablet personal computer; using the typing input device to input a second signal to the operating system of the tablet personal computer; and using the means for signal associating to monitor the existence of the first signal, wherein when the first signal is detected, the means for signal associating can command the second signal control element to stop transmitting the second signal into the operating system of the tablet personal computer.

According to the aforementioned embodiments, the features of the present invention are utilizing a key lock means on a tablet personal computer to monitor the first signal generated by a graphic input device and command a typing input device to stop inputting signals into the operating system of the tablet personal computer as the first signal is detected, thereby preventing the signals generated by the graphic device from being disrupted by undesired signals due to an unintended touch of a typing input device during a graphic inputting process.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The objective of the present invention is to provide a key lock means for a tablet personal computer.

The foregoing aspects and many of the attendant advantages of this invention will become more readily appreciated as the same, and become better understood by reference to the following embodiments of a tablet personal computer having means of key lock.

Figure 1:
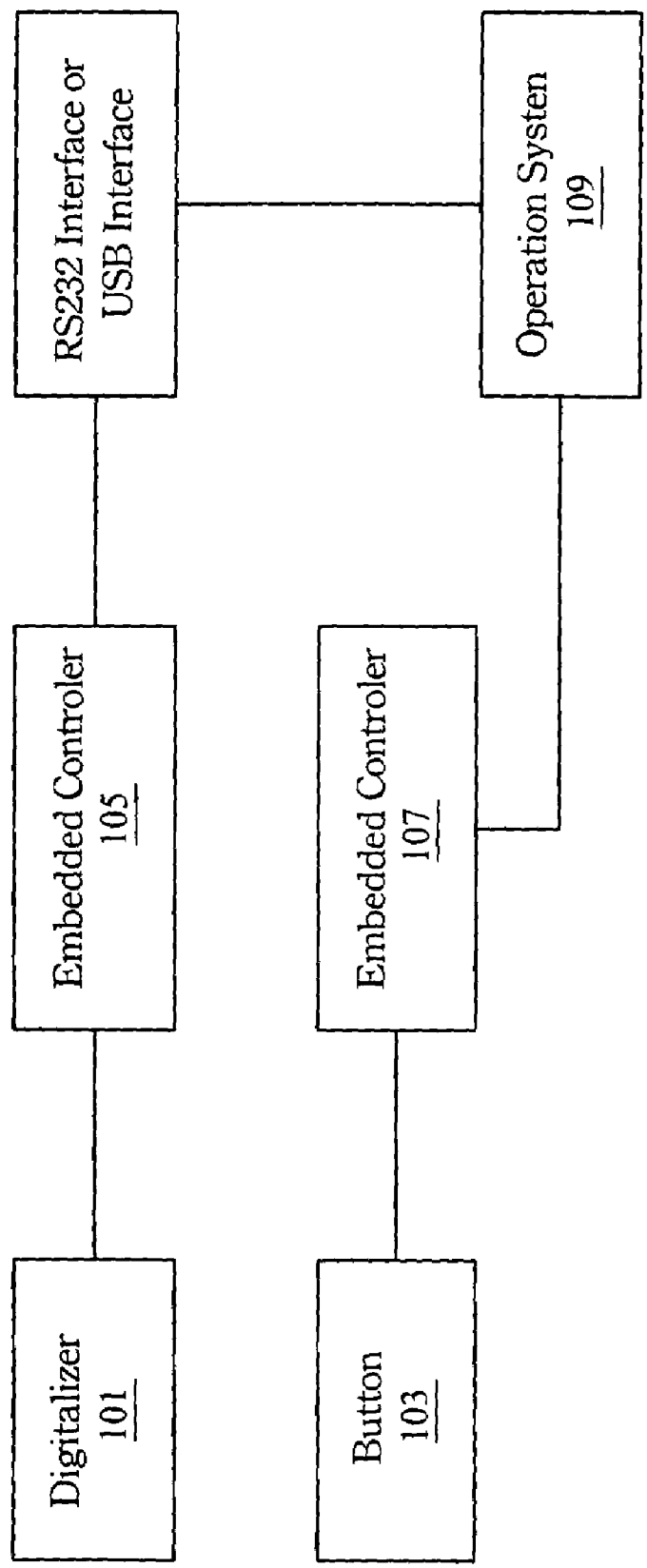
FIG. 1 is a block diagram illustrating the signal inputting process of a tablet personal computer in accordance with the prior art.
Figure 2:
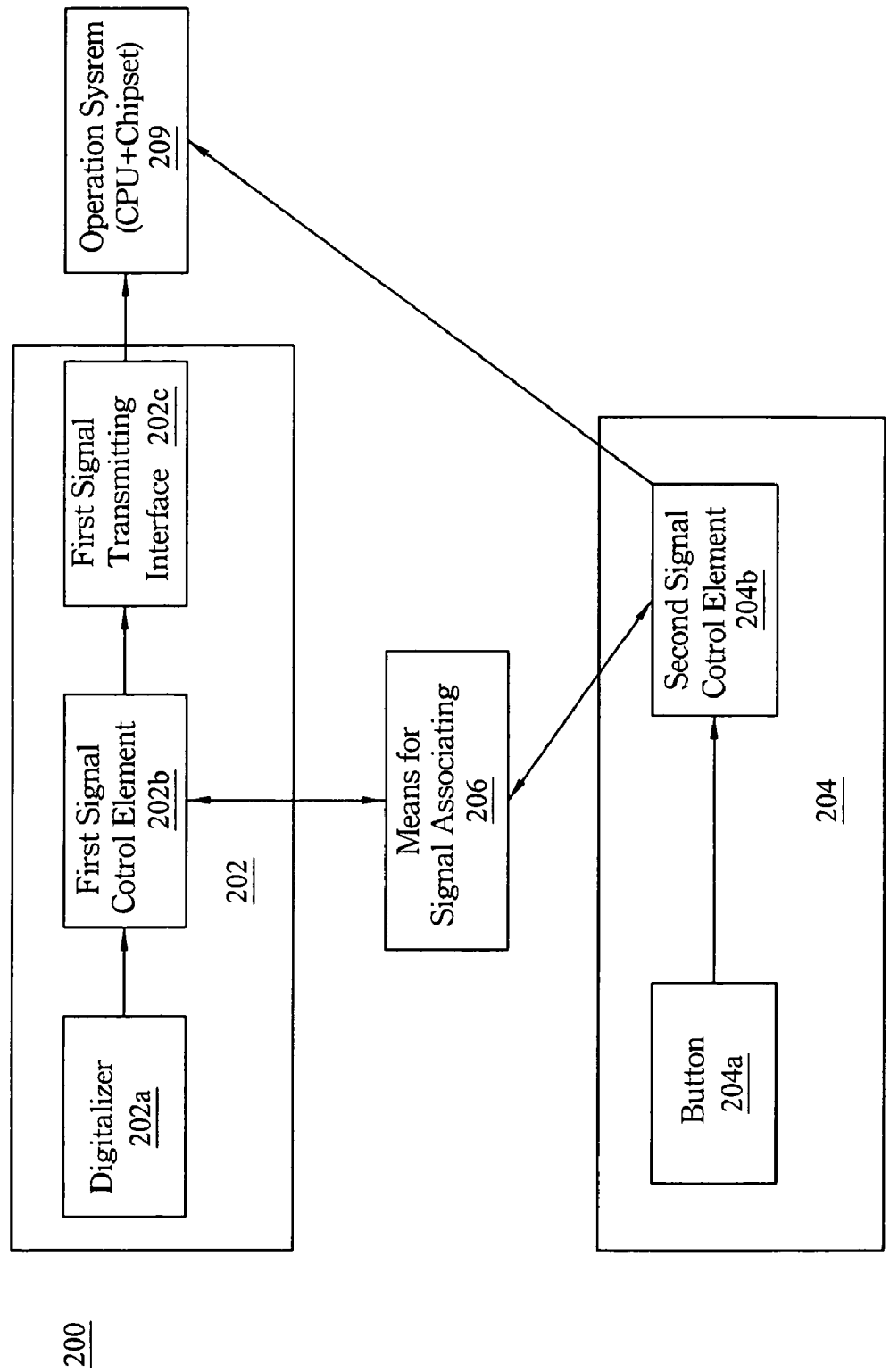
FIG. 2 is a block diagram illustrating the signal inputting process of a key lock means of a tablet personal computer in accordance with the preferred embodiment of the present invention.

FIG. 2 is a block diagram illustrating the signal inputting process of a key lock means of a tablet personal computer in accordance with the preferred embodiment of the present invention. In the present embodiment the tablet personal computer has a key lock means 200 that comprises a graphic input device 202, a typing input device 204, and a means for signal associating 206.

The graphic input device 202 comprises a digitizer 202a and a first signal control element 202b, wherein the digitizer 202a is used for graphically inputting signals into the operating system 209 of the tablet personal computer consisting of a chip set, a central processing unit (CPU) or the combination thereof by graphics drawn on the digitizer. In the present embodiment, when the digitizer 202 is touched via a stylus (not shown) or a finger, a first signal can be generated and transmitted to the operating system 209 of the tablet personal computer for further treatment.

The first signal control element 202b is used to control the transmitting process of the first signal.

In other embodiments of the present invention, the graphic input device 202 further comprises a signal transmitting interface 202c, such as an RS232 serial communication interface or a USB interface allowing the first signal to pass through to the operating system 209 of the tablet personal computer.

The typing input device 202 comprises at least one button 204a and a second signal control element 204b. The button 204a may be a mechanical button having conventional piezoelectric elements, such as flexible printed circuits. In some embodiments of the present invention the button 204a may be an on-screen virtual button set on the digitizer 202a. When the button 204a is pressed or typed, a second signal can be generated and transmitted to the operating system 209 of the tablet personal computer for further treatment.

The second signal control element 204b is used to control the transmitting process of the second signal. In the preferred embodiment of the present invention, the second signal control element 204b may be an embedded controller.

The means for signal associating 206 is used for associating with the first signal control element 202b and the second signal control element 204b. For example, the means for signal associating 206 may monitor the existence of the first signal to decide whether or not to transmit the second signal into the operating system 209 of the tablet personal computer to prevent both signals from being transmitted into operating system 209 simultaneously. If the first signal is detected during a predetermined interval, the means for signal associating 206 can command the second signal-control element 204b to stop transmitting the second signal into the operating system 209 of the tablet personal computer, preventing the operating system 209 from being disrupted by undesired signals. In the preferred embodiment of the present invention, the means for signal associating 206 is built in the second signal control element 204b, but in some embodiments of the present invention, the means for signal associating 206 is an independent third signal control element.

In the present embodiment, the existence of the first signal is determined by the means for signal associating 206 depending on the variation of electricity passing through the signal transmitting interface 202c.

Figure 3:
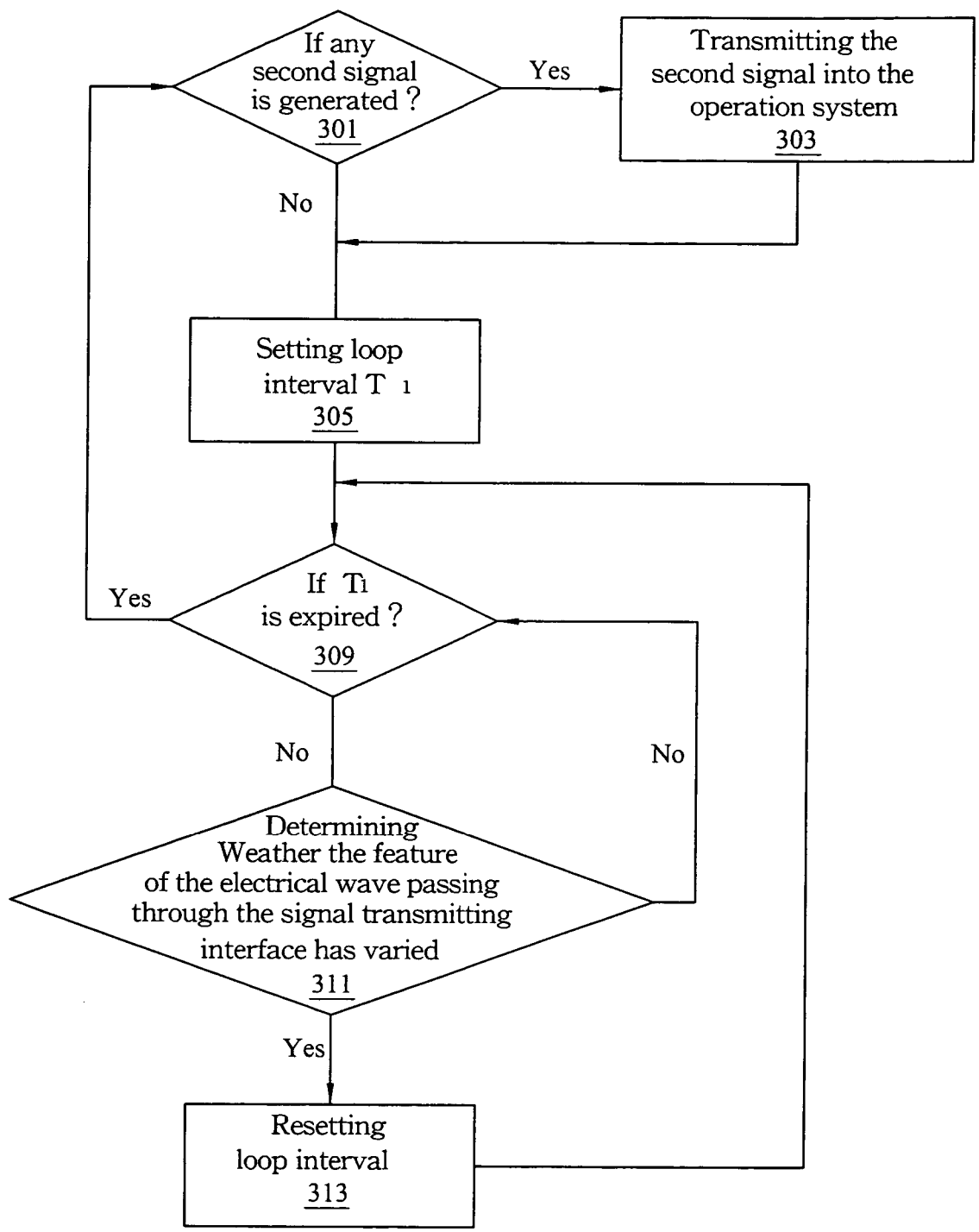
FIG. 3 is a flowchart illustrating the process for determining the existence of the first signal in accordance with the preferred embodiment of the present invention.

FIG. 3 is a flowchart illustrating the process for determining the existence of the first signal, in accordance with the preferred embodiment of the invention.

Referring to step 301, if no signal is being generated by the graphic input device 202, the second signals generated by the typing input device 202 may be transmitted into the operating system 209 of the tablet personal computer through the second signal control element 204b for further treatment (referring to step 303). If signals are being generated by the graphic input device 202, a loop interval Ti preferably of 500 seconds is initialized in the second signal control element 204b (referring to step 305).

Referring to step 309, during the loop interval T1, the means for signal associating 206 may detect the electrical signal passing through the signal transmitting interface 202c to determine if the electricity passing through the signal-transmitting interface has varied. Referring to step 311, if the electricity has not varied, the loop is wholly completed.

Referring to step 313, if the electricity has varied, the loop interval T1 is reset. When the feature of the electrical signal is varying, a graphic input process is proceeding and the loop is not terminated. Therefore, the second signal generated by the typing input device 204 cannot be transmitted to the operating system 209.

In some embodiments of the present invention, the means for signal associating 206 may utilize another pathway to determine the existence of the first signal. The pathway is to detecting a third signal revealed by the first signal control element 202b, while the first signal is generated by the graphic input device 202. In the embodiment of the present invention, the means for signal associating 206 is passively informed that the graphic input device 202 has generated the first signal by receiving the third signal. When the first signal exists, the means for signal associating 206 commands the second signal control element 204b to stop transmitting the second signal to the operating system 209 of the tablet computer during the graphic inputting process.

In addition, another objective of the present invention is to provide a method for preventing any unintended typing signals from being inputted in a tablet personal computer.

Figure 4:
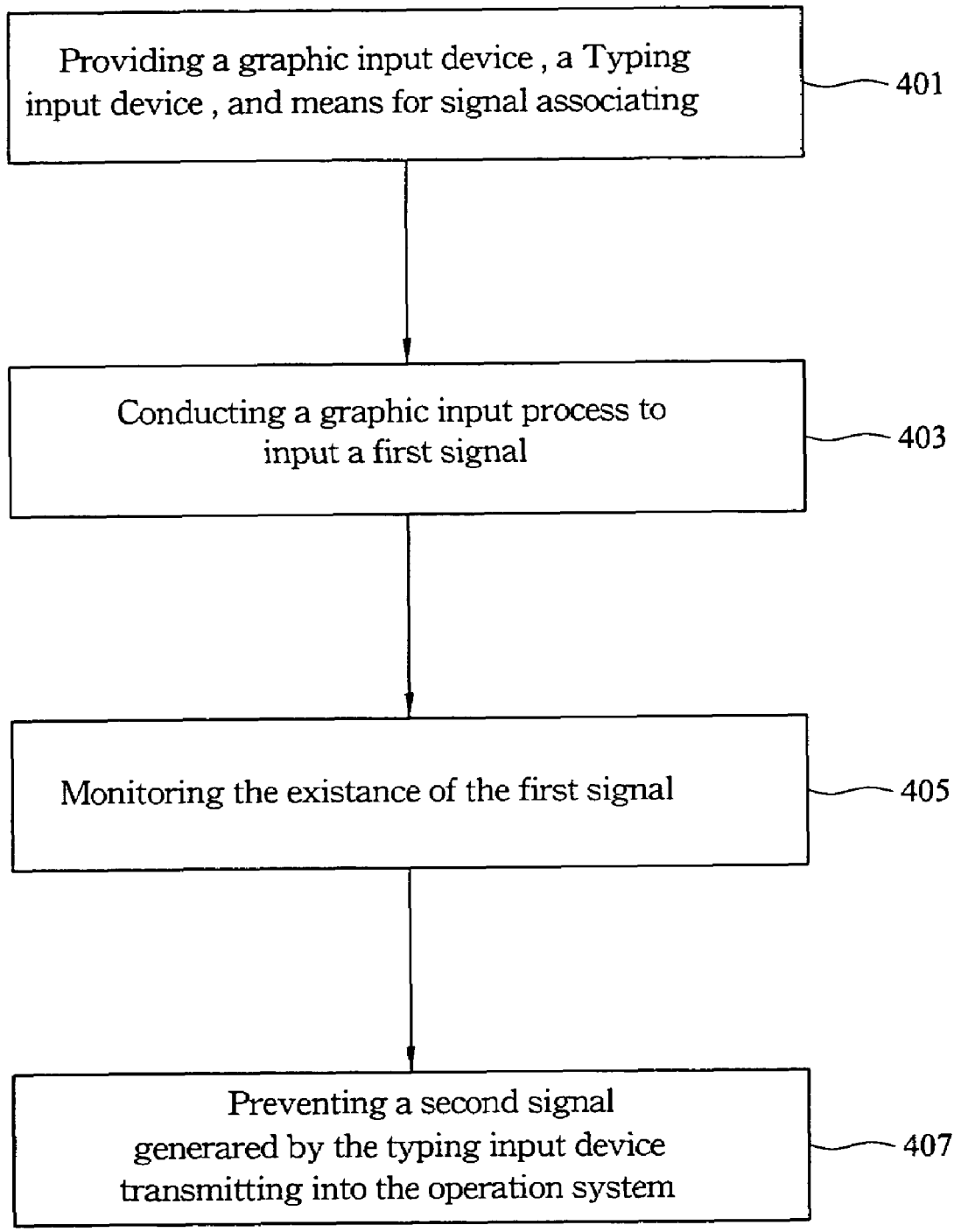
FIG. 4 is a flowchart illustrating the method for preventing any unintended typing signals from being inputted in a tablet personal computer in accordance with the preferred embodiment of the present invention.

FIG. 4 is a flowchart illustrating this method. First, a graphic input device, a typing input device, and a means for signal associating are provided (step 401), wherein the graphic input device having a digitizer is used for inputting a first signal to the operating system of the tablet personal computer, and the typing input device is used for inputting a second signal to the operating system of the tablet personal computer (step 403).

Subsequently, the means for signal associating is used to monitor the existence of the first signal (step 405). When the first signal is detected, the means for signal associating can command the second signal control element to stop transmitting the second signal into the operating system 209 of the tablet personal computer (step 407).

According to the aforementioned embodiments, the feature of the present invention are utilizing a key lock means for monitoring and controlling the transmitting process of the first and second sign to monitor the first signal generated by a graphic input device and command a typing input device to stop inputting signals into the operating system of the tablet personal computer as the first signal is detected, thereby preventing the signals generated by the graphic device from the disruption of undesired signals due to an unintended touch of a typing input device during a graphic inputting process.

As is understood by a person skilled in the art, the foregoing preferred embodiments of the present invention are illustrative of the present invention rather than limiting of the present invention. It is intended that various modifications and similar arrangements included within the spirit and scope of the appended claims are covered, the scope of which should be accorded the broadest interpretation so as to encompass all such modifications and similar structure.

What is claimed is:

1. A key lock means for a tablet personal computer, comprising:

a graphic input device for generating a first signal and transmitting the first signal to an operating system of the tablet personal computer, the graphic input device including a first signal control element for controlling the transmission of the first signal;

a typing input device for generating a second signal and transmitting the second signal to the operating system of the tablet personal computer, the typing input device including a second signal control element for controlling the transmission of the second signal; and means for signal associating so as to monitor and control the transmitting process of the first and second signals, wherein when the first signal is detected, the means for signal associating prevents the typing input device from transmitting the second signal into the operating system of the tablet personal computer;

wherein when the first signal is generated, a third signal is revealed from the first signal control element to inform the means for signal associating to command the second signal control element not to transmit the second signal to the operating system of the tablet personal computer.

2. A method for preventing unintended typing signals to be inputted to a tablet personal computer, comprising:

conducting a graphic input process to input a first signal to an operating system of the tablet personal computer;

typing so as to input a second signal to the operating system;

monitoring and controlling the input of the first and second signals through a means for signal associating; and determining the existence of the first signal, wherein the first signal is detected, preventing the typing input device from transmitting the second signal into the operating system;

wherein when the graphic input process is conducted, a third signal is revealed from a first signal control element to inform the means for signal associating to command a second signal control element not to transmit the second signal to the operating system.

* * * * *

UNITED STATES PATENT AND TRADEMARK OFFICE
CERTIFICATE OF CORRECTION

PATENT NO.        : 7,616,194 B2                                    Page 1 of 1
APPLICATION NO. : 11/363927
DATED             : November 10, 2009
INVENTOR(S)       : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 924 days.

Signed and Sealed this

Nineteenth Day of October, 2010

David J. Kappos
*Director of the United States Patent and Trademark Office*